US007537022B2

(12) United States Patent
LaBenz et al.

(10) Patent No.: US 7,537,022 B2
(45) Date of Patent: May 26, 2009

(54) VALVE ACTUATOR ASSEMBLY

(75) Inventors: Joel E. LaBenz, Chandler, AZ (US); Dori M. Marshall, Mesa, AZ (US); Kenneth A. Roberts, Phoenix, AZ (US); Osman J. Coronel, Chandler, AZ (US)

(73) Assignee: Honeywell International Inc., Morristown, NJ (US)

( * ) Notice: Subject to any disclaimer, the term of this patent is extended or adjusted under 35 U.S.C. 154(b) by 612 days.

(21) Appl. No.: 11/271,992

(22) Filed: Nov. 9, 2005

(65) Prior Publication Data

US 2007/0102049 A1 May 10, 2007

(51) Int. Cl.
*F16K 37/00* (2006.01)

(52) U.S. Cl. ................................. 137/554; 324/207.18

(58) Field of Classification Search ................ 137/554, 137/553; 324/207.18

See application file for complete search history.

(56) References Cited

U.S. PATENT DOCUMENTS

| | | | | |
|---|---|---|---|---|
| 3,390,943 | A * | 7/1968 | Myers | 137/554 |
| 4,216,795 | A | 8/1980 | Cobb et al. | |
| 4,431,159 | A * | 2/1984 | Stubbs | 137/554 |
| 4,635,901 | A | 1/1987 | Pond | |
| 4,644,355 | A | 2/1987 | Russell | |
| 4,651,969 | A | 3/1987 | Dowdall | |
| 4,756,229 | A | 7/1988 | Drakeley | |
| 5,012,722 | A | 5/1991 | McCormick | |
| 5,020,315 | A | 6/1991 | Leachman, Jr. et al. | |
| 5,735,122 | A | 4/1998 | Gibbons | |
| 6,267,349 | B1 | 7/2001 | Gomes et al. | |
| 6,655,151 | B2 * | 12/2003 | Mahoney et al. | 60/773 |
| 6,695,578 | B2 | 2/2004 | Winslow et al. | |
| 6,725,876 | B2 | 4/2004 | Bowman et al. | |
| 6,775,990 | B2 | 8/2004 | Swinford | |
| 6,783,108 | B2 | 8/2004 | Jansen | |
| 6,882,924 | B2 | 4/2005 | Miller | |
| 6,892,745 | B2 | 5/2005 | Benson | |
| 7,093,613 | B2 * | 8/2006 | Hofling et al. | 324/207.18 |
| 7,328,719 | B2 * | 2/2008 | Madden | 137/554 |
| 2002/0189263 | A1 | 12/2002 | Rayer et al. | |
| 2004/0080313 | A1 | 4/2004 | Brosh | |
| 2004/0113109 | A1 | 6/2004 | Silva | |
| 2005/0044858 | A1 | 3/2005 | Hooker et al. | |

FOREIGN PATENT DOCUMENTS

WO 0220997 A2 3/2002

OTHER PUBLICATIONS

EP Search Report, 06123665.9 dated Jul. 2, 2008.

* cited by examiner

*Primary Examiner*—Kevin L Lee
(74) *Attorney, Agent, or Firm*—Ingrassia Fisher & Lorenz, P.C.

(57) ABSTRACT

A valve actuator is provided that comprises a unitary housing and a piston translatably mounted within the housing. The piston comprises a first portion having a first diameter and a second portion having a second diameter that is greater than the first diameter. A position sensor having a third diameter at least as large as the second diameter is fixedly coupled to the housing and to the piston for determining the position of the piston.

18 Claims, 5 Drawing Sheets

VALVE ACTUATOR ASSEMBLY

FIELD OF THE INVENTION

The present invention generally relates to valve actuators and, more particularly, to an improved fuel powered actuator assembly for use in conjunction with a valve assembly to control pneumatic flow therethrough.

BACKGROUND OF THE INVENTION

It is well-known that pneumatic valve assemblies may be partially disposed within an airway defined by a flowbody to control flow of a fluid (e.g., air) therethrough and thus perform any one of a number of functions (e.g., temperature regulation). Valve assemblies of this type typically comprise a valve (e.g., a butterfly valve) that is coupled by way of a linkage assembly to an actuator. The actuator includes a piston and an actuator housing, which may be fixedly coupled to the flowbody. The piston has a first end coupled to the linkage assembly and translates within the housing to actuate the valve. The extension of the piston relative to the actuator housing may cause the valve to open and thus permit airflow through the flowbody, and the retraction of the piston may cause the valve to close and obstruct airflow; however, it should be appreciated that the valve assembly may instead be configured such that the valve opens and closes with piston retraction and extension, respectively. In fuel actuated valve assemblies (e.g., bleed valve assemblies, control valve assemblies, cooling valve assemblies, etc.), the pressure differential described above may be externally controlled to command valve positioning within the airway.

The movement of the piston within the actuator housing is dictated by the pressure differential between two hydraulic chambers (i.e., a closing chamber and an opening chamber) within the actuator housing and generally defined by the inner surface of the housing. These chambers may be isolated from each other by a cuffed region of the piston that ends radially outward to sealingly engage the inner surface of the housing. When the pressure in the opening chamber exerts a force on the piston greater than that exerted by the pressure in the closing chamber, the piston extends and the valve opens. Conversely, when the pressure in the closing chamber exerts a force on the piston greater than that exerted by the pressure in the opening chamber, the piston retracts and the valve closes. In some valve assemblies, a linear positioning sensor (e.g., a linear variable differential transformer, or LVDT) is disposed within the actuator housing to facilitate monitoring the displacement of the piston therein and establishing the position of the valve plate within the airway. After determining the current position of the piston, a controller may initiate an appropriate adjustment to move the piston to a target position and thereby actuate the valve in a desired manner.

Due in large part to elevated operational temperatures, leakage is a concern in fuel actuated valve assemblies. For this reason, these valve assemblies are routinely provided with redundant, seals to minimize the likelihood of external leakage. Joints produced when multiple sections of the housing are coupled to form the actuator body, for example, must be provided with appropriate sealing assemblies. As a representative example, a known actuator housing is formed by two separate sections: a main actuator housing section, which substantially contains the linear positioning sensor and the piston when the piston is in a retracted position; and a seal retainer section, which allows the piston rod to translate through the housing and contains a portion of the linkage. These sections are bolted together at their interface to form the actuator housing. This mechanical coupling requires an additional flange/bolt assembly and static seals disposed between the main actuator housing section/seal retainer section interface and between the seal retainer section and the piston.

Considering the above, it is not surprising that jointed actuator housings (i.e., actuator housings formed by coupling multiple sections together) result in a valve assembly of increased complexity, cost, size, and weight. Further, the additional seals required by jointed actuator housings provide other sites at which external leakage may occur thus decreasing system reliability and increasing maintenance demands. Further still, due to the stroke force produced by the action of the piston, such housings may experience structural stress at their joints, which may result in increased wear on the seals and an increased likelihood of fuel leakage.

It should thus be appreciated from the above that it would be desirable to provide an improved fuel powered actuator assembly including a unitary housing that reduces the number of requisite joints and seals, and therefore reduces the overall cost, complexity, weight, and size of the assembly. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

A valve actuator is provided that comprises a unitary housing and a piston translatably mounted within the housing. The piston comprises a first portion having a first diameter and a second portion having a second diameter that is greater than the first diameter. A position sensor having a third diameter at least as large as the second diameter is fixedly coupled to the housing and to the piston for determining the position of the piston.

BRIEF DESCRIPTION OF THE DRAWINGS

The present invention will hereinafter be described in conjunction with the following drawing figures, wherein like numerals denote like elements, and.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
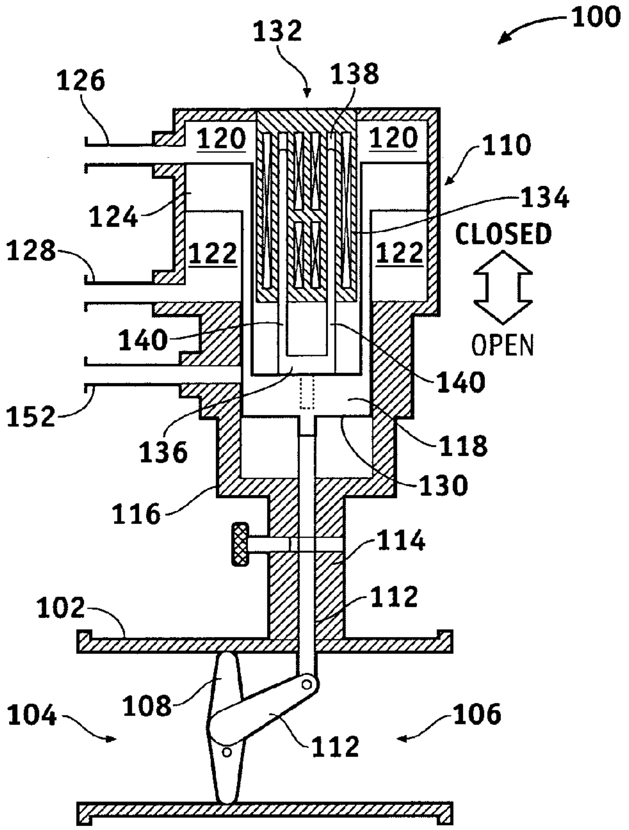
FIG. 1 PRIOR ART
FIGS. 1 and 2 are functional cross-sectional diagrams of a known pneumatic valve assembly in closed and open positions, respectively.
Figure 2:
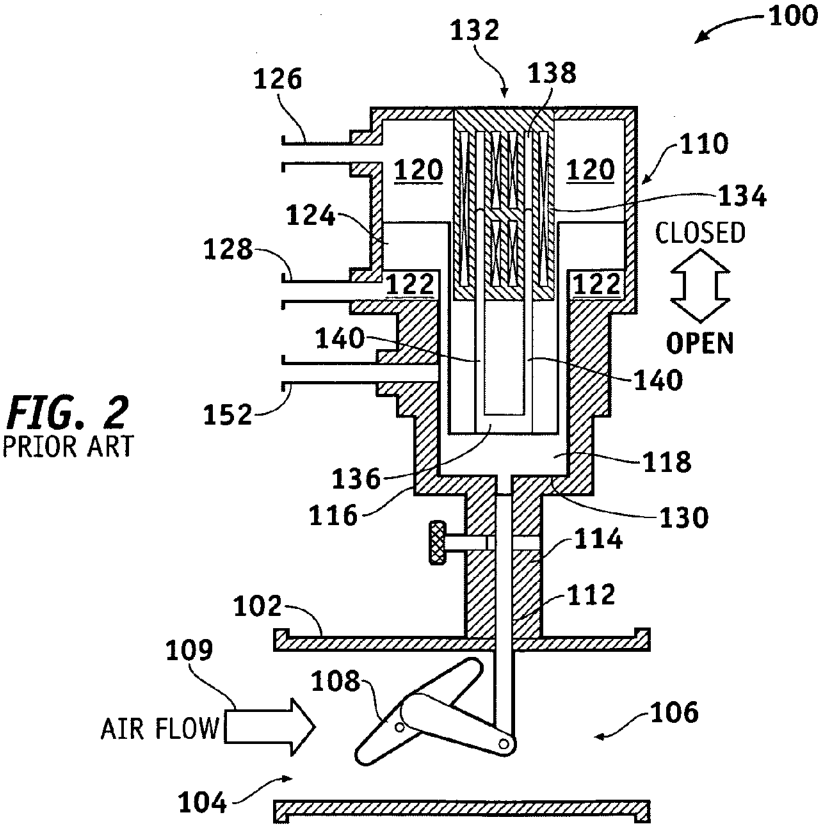
FIG. 2 PRIOR ART

FIGS. 1 and 2 are functional and generalized cross-sectional views of a conventional valve assembly 100 in closed and open positions, respectively. Valve assembly 100 is configured to control the flow of a fluid (e.g., pressurized air) through a flow passage (e.g., an airway) defined by flowbody 102 having an inlet port 104 and an outlet port 106. A flow control valve plate 108 (e.g., a butterfly valve plate) is disposed within the airway and is configured to move between a closed (FIG. 1) and an open position (FIG. 2). When closed, valve plate 108 substantially prevents airflow from inlet port 104 to outlet port 106. In contrast, when valve plate 108 is open, air may flow from port 104 to port 106 as indicated in FIG. 2 by arrow 109.

Valve plate 108 is coupled to a valve actuator 110 by way of a linkage 112, part of which passes through a sealing shaft 114. Actuator 110 comprises an actuator housing 116 and a piston 118 that resides therein. Though multiple sections are coupled together to form housing 116, actuator housing 116 is shown as one body for clarity in FIGS. 1 and 2. Piston 118, which comprises a cuffed portion 124 and a first end 130 that is coupled to linkage 112, is configured to translate within housing 116 between first and second positions, a retracted position (FIG. 1) and an extended or stroked position (FIG. 2). As mentioned previously and as illustrated in FIG. 1, when piston 118 retracts, linkage 112 moves toward actuator housing 116 and valve plate 108 closes. Conversely, as is shown in FIG. 2, when piston 118 extends, linkage 112 moves away from actuator housing 116 and valve plate 108 opens.

The position of piston 118 within housing 116, and thus the status of valve plate 108, is controlled by the pressure differential between two hydraulic chambers, an opening chamber 120 and a closing chamber 122, which are provided within housing 116. Chambers 120 and 122 are separated within housing 116 by cuffed portion 124 of piston 118, which extends radially outward from the remainder of piston 118 to sealingly engage an interior surface of housing 116. When the pressure in opening chamber 120 exerts a greater force on piston 118 than does the pressure in closing chamber 122, piston 118 extends and valve plate 108 opens. Conversely, when the pressure in closing chamber 122 exerts a greater force on piston 118 than does that in opening chamber 120, piston 120 retracts and valve plate 108 closes. Chambers 120 and 122 are fluidly coupled to suitable hydraulic (e.g., fuel) sources by way of ducts 126 and 128, respectively.

Valve actuator 110 also includes a linear positioning sensor 132 for determining the position of piston 118 within actuator housing 116. Sensor 132 may be an electromechanical transducer such as a linear variable differential transformer (LVDT) and will be referred to as such hereafter for the purposes of illustration only. LVDT 132 comprises a translatable head 136 and a stationary body portion 134 having at least one longitudinal channel or bore 138 provided therein. For increased reliability, a dual-channel LVDT may be utilized as indicated in FIGS. 1 and 2.

Figure 3:
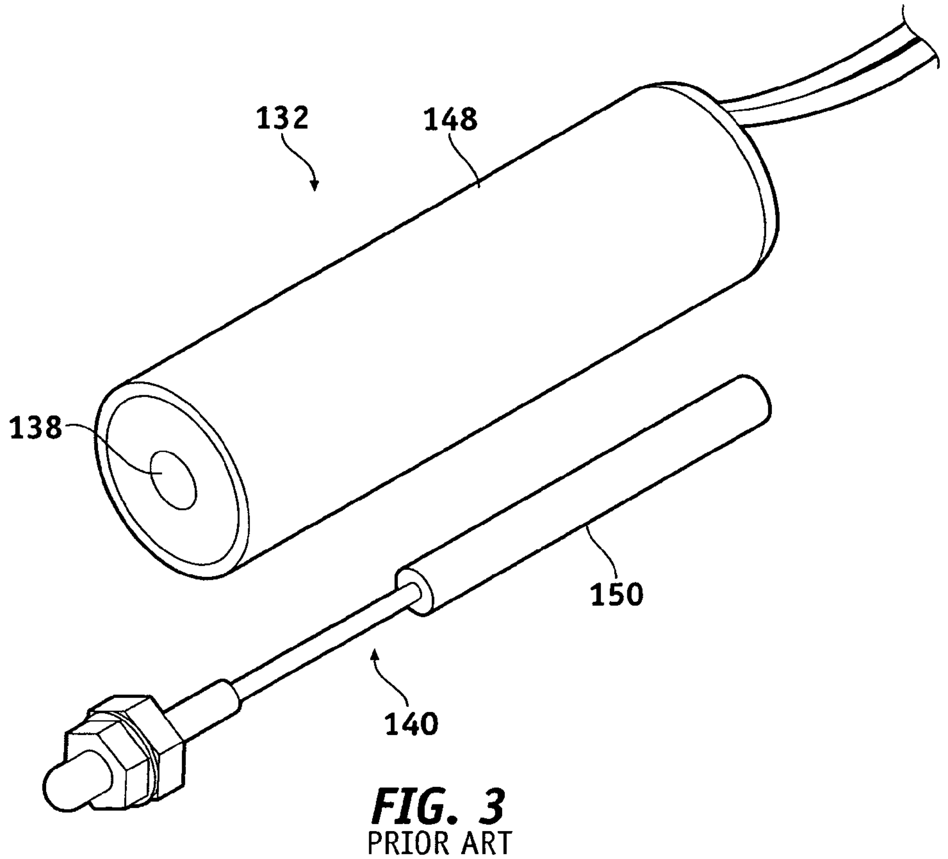
FIG. 3 PRIOR ART
FIGS. 3 and 4 are isometric and cutaway views, respectively, of a linear variable differential transformer suitable for use in conjunction with the valve assembly shown in FIGS. 1 and 2.
Figure 4:
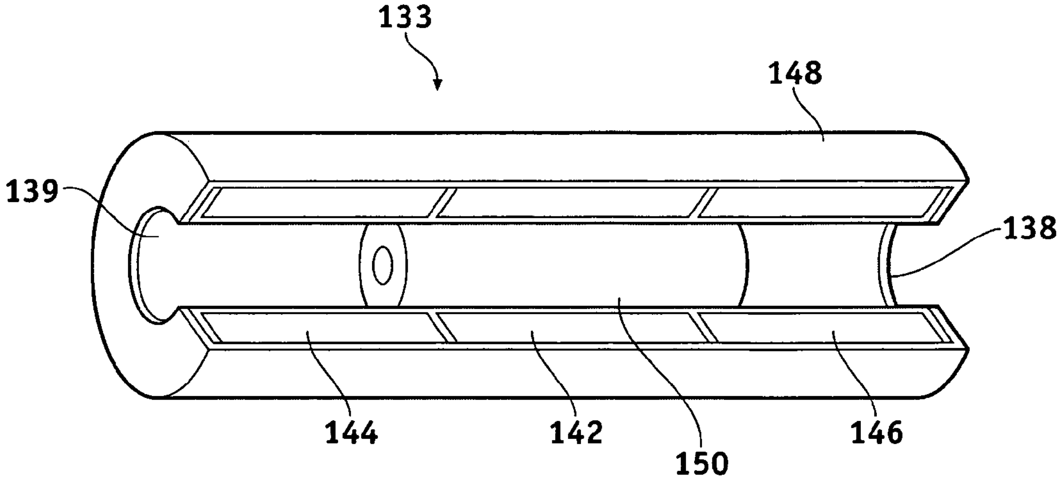
FIG. 4 PRIOR ART

FIGS. 3 and 4 are isometric and cutaway views of a portion of a typical LVDT 133, respectively. A bore 139 is configured to receive a translatable member (e.g., rod) 140 (only partially shown in FIG. 4) that slides axially within bore 139. Rod 140 may be fixedly coupled at one end to a translatable head 136, which, in turn, is coupled to piston 118. The translation of piston 118 results in the movement of translatable head 136 and thus the translation of rod 140 within bore 139. LVDT 133 may determine the positioning of rod 140 within bore 139, and thus the position of piston 118 within actuator housing 116, in the manner described in the following paragraph.

As is most clearly shown in FIG. 4, LVDT 133 comprises one central or primary winding 142 and two secondary windings 144 and 146, which are disposed on either side of winding 142. Windings 142, 144, and 146 are each surrounded by a highly permeable magnetic shell and a high density glass and are encapsulated by epoxy in the well-known manner. Windings 142, 144, and 146 are disposed within a sensor housing 148, which may take any suitable form (e.g., cylindrical) and is typically stainless steel. A cylindrical body 150, which is commonly referred to as a core, may be disposed at one end of rod 140 and slide within bore 139 and through windings 142, 144, and 146 without physically contacting the inner surface of LVDT 133. Core 150 consists of a material (e.g., a nickel-iron composite) that is highly permeable to magnetic flux. During operation, an alternating current (i.e., the primary excitation) energizes primary winding 142. The differential AC voltage between windings 144 and 146 varies in relation to the axial movement of core 150 within bore 139. Electronic circuitry (not shown) disposed within LVDT 133 converts the AC output voltage to a suitable current (e.g., high level DC voltage) indicative of the position of core 150 and rod 140 within bore 139, which is sent to, for example, a control module. As rod 140 is coupled to piston 118 in the manner described above, LVDT 133 may determine the position of piston 118 within actuator housing 116 and, consequently, the position of valve plate 108 within flowbody 102. LVDTs are well known and further discussion of these linear positioning sensors is not deemed necessary; however, the interested reader is referred to U.S. Pat. No. 5,469,053 entitled "E/U Core Linear Variable Differentia Transformer for Precise Displacement Measurement" issued Nov. 21, 1995.

As mentioned above, fuel actuated valve assemblies such as valve assembly 100 employ redundant seals to minimize the likelihood of external fuel leakage. It should be clear, however, that no such seals are shown in FIGS. 1 and 2, which are intended only to generally illustrate the operation of a conventional fuel actuated valve assembly. This notwithstanding, it may be helpful to note that, in known valve assemblies, redundant dynamic seals are typically disposed between an interior surface of housing 116 and piston 118, for example, proximate cuffed portion 124 and first end 130. Static seals are also typically disposed between actuator 110 and housing 116. Lastly, static seals are disposed as required at joints produced when two or more sections are coupled to form actuator housing 116 as described above.

Figure 5:
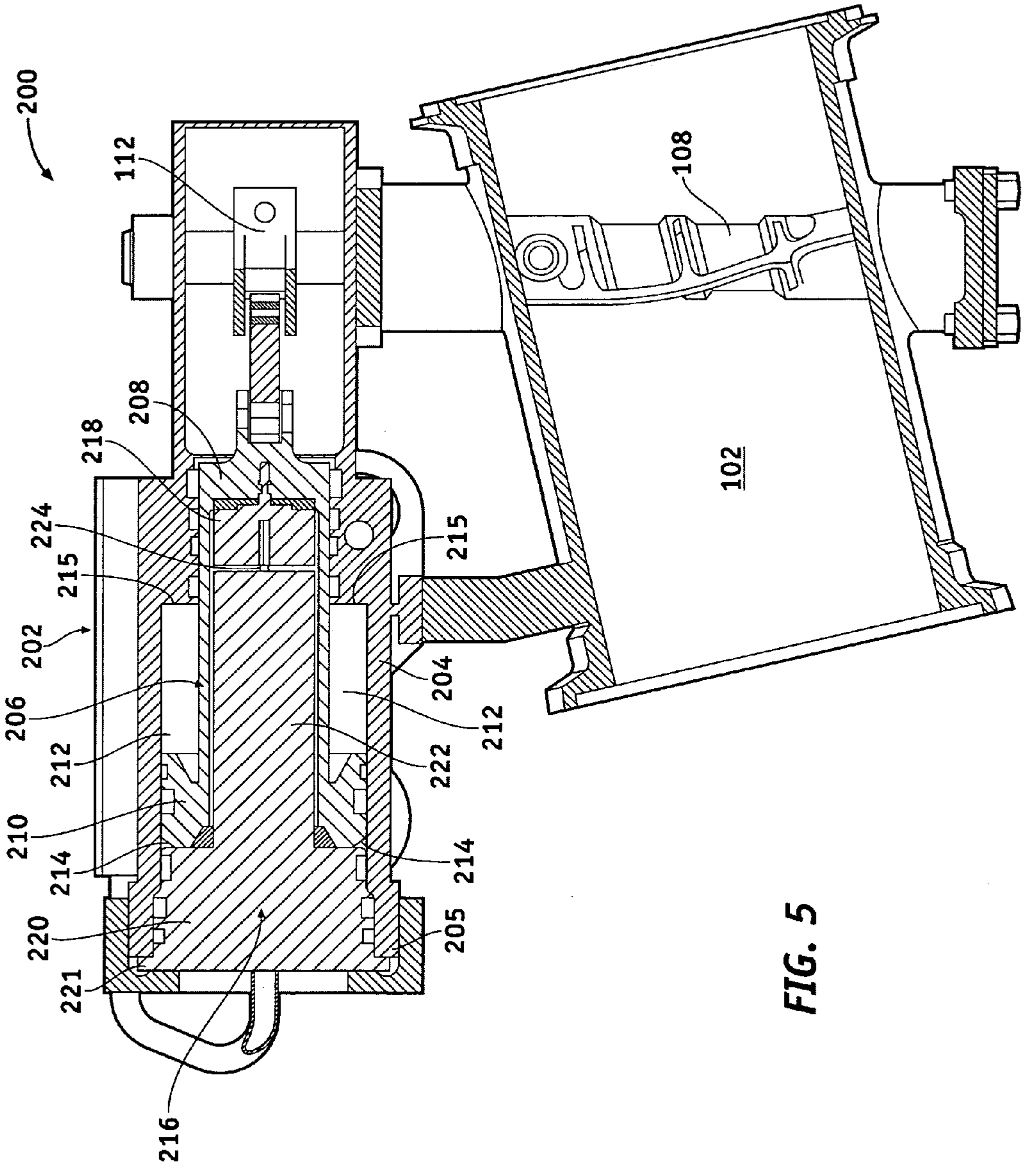
FIG. 5 is side cross-sectional view of a valve assembly including a valve actuator in accordance with a first embodiment of the present invention.
Figure 6:
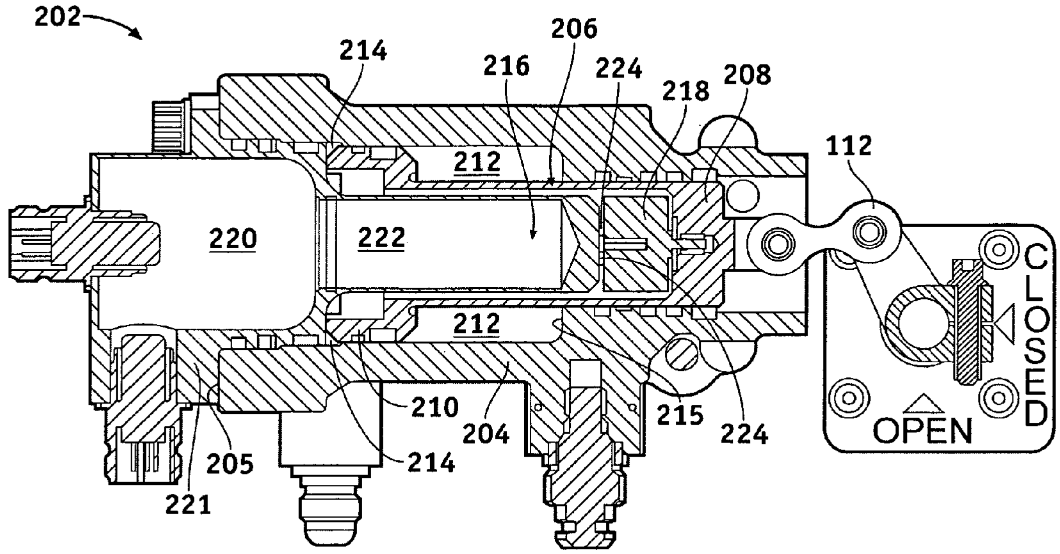
FIGS. 6 and 7 are cross-sectional views of the actuator shown in FIG. 5 in retracted (valve closed) and extended (valve open) positions, respectively.
Figure 7:
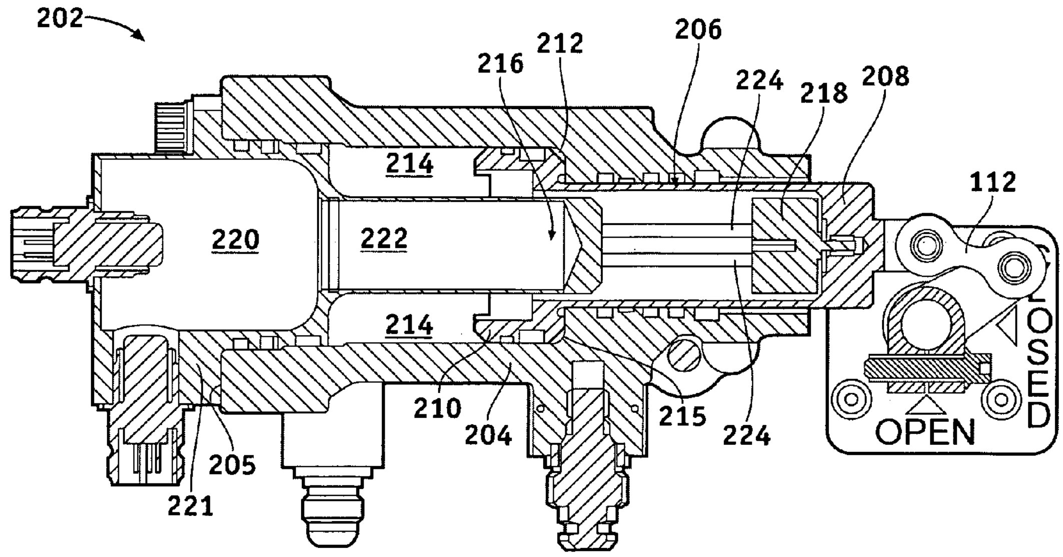

FIG. 5 is a side cross-sectional view of a valve assembly 200 including a valve actuator 202 in accordance with a first embodiment of the present invention. FIGS. 6 and 7 are top cross-sectional views of actuator 202 in retracted (valve closed) and extended (valve open) positions, respectively. As can be seen in FIGS. 5-7, valve actuator 202 includes a unitary housing 204 that is comprised of a single body. Unitary housing 204 is provided with a relatively large opening at a first end 205 thereof, which may permit the insertion of a piston 206 and a linear positioning sensor 216 into housing 204 during assembly. Piston 206 is translatably mounted within housing 204 and has a first end portion 208 and has a cuffed portion 210. First end portion 208 of piston 206 is coupled to linkage 112 and may translate between a retracted position (FIG. 6) and an extended position (FIG. 7) to close and open valve plate 108, respectively (or, perhaps, to open and close valve plate 108, respectively). Cuffed portion 210 of piston 206 extends radially outward to sealingly engage an inner surface of housing 204 and define a closing chamber 212 and an opening chamber 214, which may fluidly communicate with suitable hydraulic sources via first and second ducts, respectively.

Valve actuator 202 functions in much the same manner as does fuel powered actuator 110 described in detail above in conjunction with FIGS. 1 and 2; thus, the following description will focus on function aspects of actuator 110. However, it may be beneficial to recall at this time that the pressure differential between closing chamber 212 and opening chamber 214 dictates the translational position of a piston 206 within unitary housing 204 and thus the position of valve plate 108 within flowbody 102 (FIG. 5). Specifically, when the pressure in opening chamber 214 exerts a greater force on piston 206 than does the pressure in closing chamber 212, piston 206 extends (FIG. 7) such that cuffed portion 210 abuts an inner wall 215 provided within housing 204 and valve plate 108 opens. Conversely, when the pressure in closing chamber 212 exerts a greater force on piston 206 than does that in opening chamber 214, piston 206 retracts (FIG. 6) such that cuffed portion 210 abuts linear positioning sensor 216 and valve plate 108 closes.

Linear positioning sensor 216 is disposed within housing 204 to monitor the translational position of piston 206. As was the previously case with sensor 132, linear position sensor 216 may be an LVDT and is preferably a dual-channel LVDT as shown in FIGS. 5-7. LVDT 216 comprises a translatable armature or head 218 and a stationary body 220, which may include an elongated neck 222 that extends into a cavity provided within piston 206. Body 220 also includes a flange region 221 having an increased diameter. Flange region 221 may be configured to abut and be fixed (e.g., bolted) to unitary housing 204 proximate end 205. Translatable head 218 is fixedly coupled to piston 206 and may translate within housing 204 along therewith. As suggested in FIGS. 5-7, for example, translatable head 218 may be threadably coupled to end portion 208 of piston 206. If LVDT 216 is a dual-channel LVDT, two rods 224 may be coupled to translatable head 218 and slide within two longitudinal bores substantially provided within neck 222. Electronic circuitry (not shown) may monitor the position of rods 224 relative to body 220 in the manner described above to determine the disposition of piston 206 within housing 204.

Figure 8:
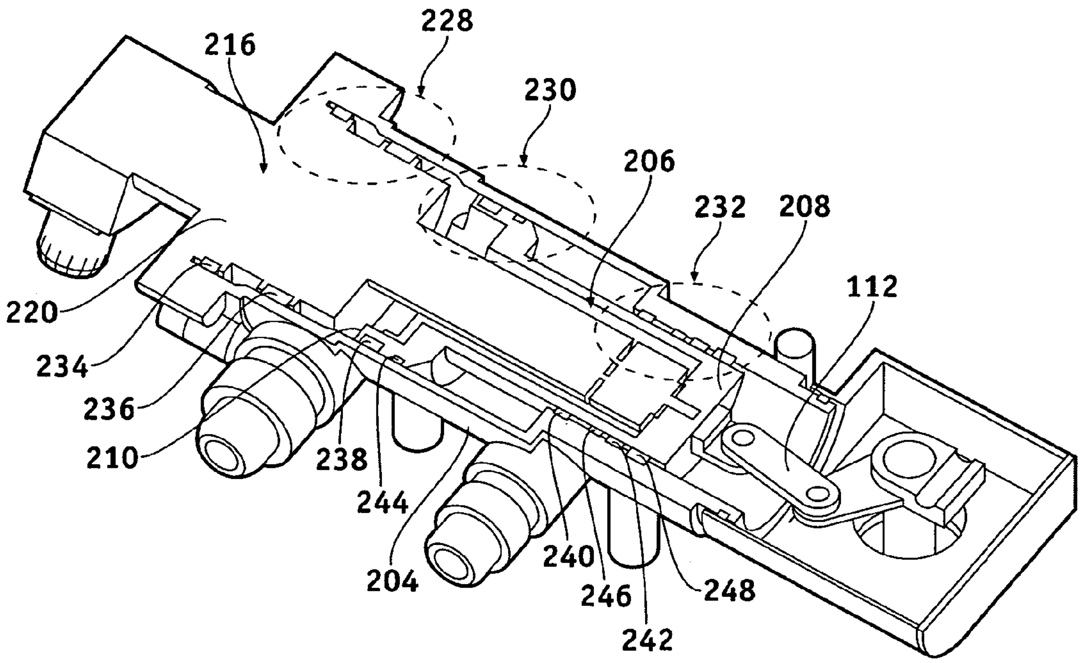
FIGS. 8 and 9 are isometric cross-sectional and isometric cutaway views, respectively, of the actuator shown in FIGS. 5-7.
Figure 9:
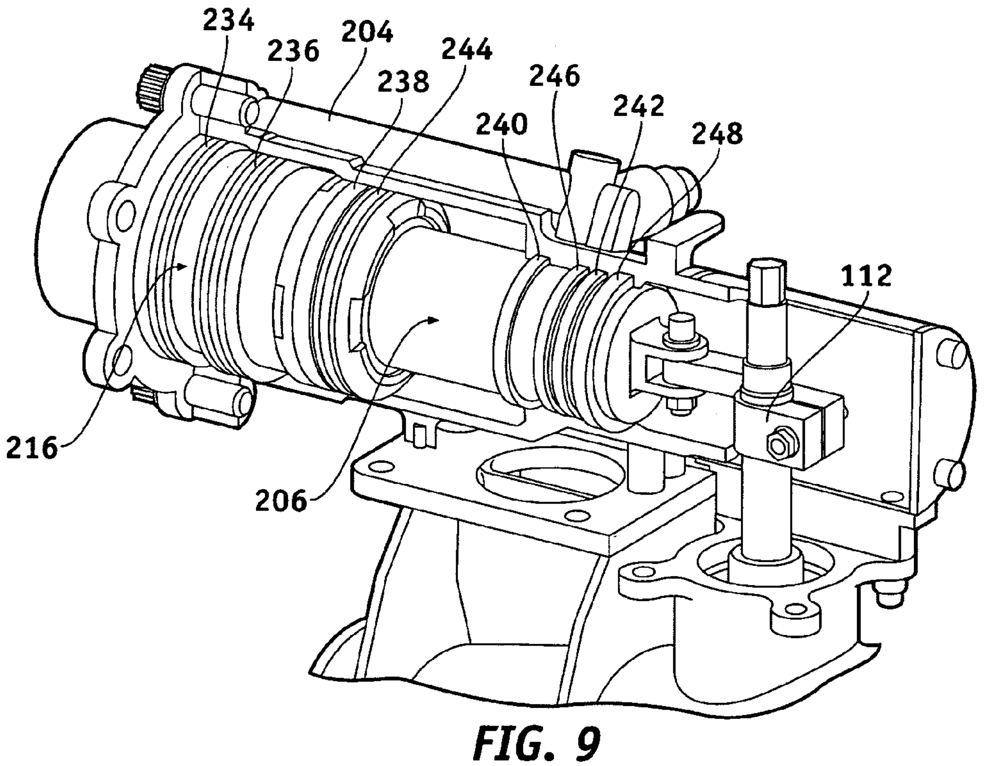

The inventive valve actuator requires less sealing assemblies than known fuel actuated assemblies and is consequently less costly, less complex, and more reliable (e.g., decreased chance of external fuel leakage). As is most clearly shown in FIGS. 8 and 9, which are isometric cross-sectional and cutaway views of actuator 202, respectively, exemplary actuator 202 includes three sealing assemblies: (1) a first static sealing assembly 228, which is disposed between an inner surface of housing 204 and body 220 of LVDT 216; (2) a second dynamic sealing assembly 230, which is disposed between an inner surface of housing 204 and cuffed portion 210 of piston 206; and (3) a third dynamic sealing assembly 243, which is disposed between an inner surface of housing 204 and piston 206 proximate end portion 208. It will be appreciated by one skilled in the art that sealing assemblies 228, 230, and 232 may each simply comprise a single sealing ring; however, if the inventive actuator is employed as a fuel powered actuator, sealing assemblies 228 and 232 each preferably comprise a plurality of sealing rings. For example, as illustrated in FIGS. 8 and 9, sealing assembly 228 may comprise a first sealing ring 234 (e.g., fluorocarbon) and a second sealing ring 236 (e.g., fluorosilicone and polytetrafluoroethylene), sealing assembly 230 may comprise a first sealing ring 238 (e.g., Turcon 19 and fluorocarbon), and sealing assembly 232 may comprise a first sealing ring 240 (e.g., Turcon 19 and fluorocarbon) and a second sealing ring 242 (e.g., Turcon 19 and fluorocarbon). As further shown in FIGS. 8 and 9, it may also be desirable to provide sealing assemblies 230 and 232 with a first seal guide 244 and a second seal guide 246, respectively. Lastly, sealing assembly 232 may include a conventional scraper 248 to exclude contaminants.

In the exemplary embodiment shown in FIGS. 5-9, it should be appreciated that the inner diameter of opening 205 is substantially equivalent to the outer diameters of body portion 220 of LVDT 216 and cuffed region 210 of piston 206. As mentioned above, unitary housing 204 is provided with an opening 205 at one end thereof, which permits the insertion of piston 206 and linear positioning sensor 216 into housing 204 during assembly. In particular, piston 206 and sealing assemblies 232 and 230 (FIGS. 8 and 9) are first inserted into housing 204 via opening 205. Piston 206 and sealing assembly 232 sealingly engage an inner surface of housing 204 proximate end portion 208 of piston 206. Additionally, due to the increased outer diameter of cuffed region 210 relative to the remainder of piston 206, region 210 and sealing assembly 230 also sealingly engage an inner surface of unitary housing 204. Next, LVDT 216 and sealing assembly 228 (FIGS. 8 and 9) are inserted into housing 204. As body 220 of LVDT 216 is provided with an increased outer diameter that is no less than (and preferably substantially equivalent to) that of cuffed region 210, body 220 and sealing assembly 228 also sealingly engage an inner surface of unitary housing 204. In this manner, device assembly is simplified and redundant sealing is accomplished utilizing three sealing assemblies. The exemplary embodiment notwithstanding, it should be appreciated that cuffed region 210 of piston 206 may have an outer diameter that is substantially less than that of body 220 providing that unitary housing 204 further includes an interior region adapted to sealingly engage region 210.

In view of the above, it should be appreciated that an improved valve actuator assembly including a unitary housing that reduces the number of requisite joints and seals, has been provided. Though the exemplary embodiment of the valve actuator assembly has been discussed above as controlling the flow of a pneumatic gas (e.g., air), it should be understood that the inventive valve actuator may be used in any suitable fluidic system. Similarly, it will be appreciated by one having ordinary skill in the art that the translational movement of the actuator's piston may be controlled by means other than the pressure differential between two hydraulic compartments (e.g., by the pressure differential between two pneumatic compartments). While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A valve actuator, comprising:

a unitary housing;

a piston translatably mounted within said housing, said piston comprising a first portion having a first diameter and a second portion having a second diameter greater than said first diameter; and a position sensor fixedly coupled to said housing and to said piston for determining the position of said piston, said position sensor having a third diameter at least as large as the second diameter;

wherein said unitary housing includes an inner wall and said second portion is configured to abut said inner wall when said piston is in an extended position.

2. A valve actuator according to claim 1 wherein said position sensor comprises a first section fixedly coupled to said housing and in sealing engagement therewith, said first section having a diameter substantially equal to the third diameter.

3. A valve actuator according to claim 2 wherein said position sensor further comprises a second section fixedly coupled to said first portion and at least partially residing therein, said second section translatably coupled to said first section.

4. A valve actuator according to claim 2 further comprising:

a first sealing assembly disposed between an inner surface of said housing and said first portion;

a second sealing assembly disposed between an inner surface of said housing and said second portion; and a third sealing assembly disposed between an inner surface of said housing and said first section.

5. A valve actuator according to claim 4 wherein said first and said third sealing assemblies each comprise at least two seals.

6. A valve actuator according to claim 1 wherein said position sensor is a linear variable differential transformer.

7. A valve actuator according to claim 6 wherein said transformer is a dual-channel linear variable transformer.

8. A value actuator according to claim 2 wherein said second portion is configured to abut said first section when said piston is in a retracted position.

9. A valve actuator, comprising:

a unitary housing;

a piston translatably mounted within said housing, said piston comprising a first portion having a first diameter and a second portion having a second diameter greater than said first diameter; and a position sensor fixedly coupled to said housing and to said piston for determining the translational position of said piston, said position sensor comprising:

a first section fixedly coupled to said housing and in sealing engagement therewith, said first section having a third diameter at least as large as the second diameter; and a second section fixedly coupled to said first portion and translatably coupled to said first section;

wherein said housing includes an opening at a first end thereof through which said piston and said positioning sensor may be inserted during assembly.

10. A valve actuator according to claim 9 further comprising:

a first sealing assembly disposed between said housing and said first portion;

a second sealing assembly disposed between said housing and said second portion; and a third sealing assembly disposed between said housing and said first section.

11. A valve actuator according to claim 10 wherein said first and said third sealing assemblies each comprise at least two seals.

12. A valve actuator according to claim 9 wherein said position sensor is a dual-channel linear variable transformer.

13. A valve actuator according to claim 9 wherein said housing includes an inner wall and said second portion is configured to abut said inner wall when said piston is in an extended position and abut said first section when said piston is in a retracted position.

14. A valve actuator according to claim 9 wherein said positioning sensor further comprises a third section having a fourth diameter larger than said third diameter, said third section configured to abut said housing proximate said first end thereof.

15. A valve actuator to be coupled to a pneumatic valve by way of a valve link, comprising:

a unitary housing;

a piston mounted within said housing and translatable therein to actuate the valve, said piston having a first portion that is coupled to the valve link and having a second portion of a first predetermined diameter;

a linear variable differential transformer for determining the linear positioning of said piston within said housing, said sensor comprising:

a body having a second predetermined diameter that is at least as large as the first predetermined diameter and having a substantially longitudinal bore therein, said body fixedly coupled to said housing; and a translatable head having a first end that is coupled to said piston and having a second end configured to translate within the longitudinal bore;

a first sealing assembly substantially disposed between said housing and said first portion;

a second sealing assembly substantially disposed between said housing and said second portion; and a third sealing assembly substantially disposed between said housing and said body.

16. A valve actuator according to claim 15 wherein said first predetermined diameter is substantially equal to said second predetermined diameter.

17. A valve actuator according to claim 15 wherein said body comprises an elongated neck portion having at least a portion of the longitudinal bore formed therein, and wherein said piston has a cavity formed therein for receiving said neck portion proximate said second portion.

18. A valve actuator according to claim 15 wherein said translatable head is coupled to said first portion.

* * * * *